United States Patent
Chen et al.

(10) Patent No.: US 12,189,766 B1
(45) Date of Patent: Jan. 7, 2025

(54) MICROGRID SELF-TRIGGERING CONTROL METHOD AND SYSTEM FOR RESISTING FDI ATTACKS

(71) Applicants: Hainan Research Institute of Zhejiang University, Sanya (CN); Zhejiang University, Hangzhou (CN)

(72) Inventors: Yulin Chen, Sanya (CN); Donglian Qi, Sanya (CN); Xing Huang, Sanya (CN); Yunfeng Yan, Sanya (CN); Shenjun Weng, Sanya (CN); Xianbo Wang, Sanya (CN)

(73) Assignees: Hainan Research Institute of Zhejiang University, Sanya (CN); Zhejiang University, Hangzhou (CN)

( * ) Notice: Subject to any disclaimer, the term of this patent is extended or adjusted under 35 U.S.C. 154(b) by 0 days.

(21) Appl. No.: 18/800,166

(22) Filed: Aug. 12, 2024

(30) Foreign Application Priority Data

Aug. 29, 2023 (CN) .......................... 202311101885.X

(51) Int. Cl.
*H04L 29/06* (2006.01)
*G06F 21/55* (2013.01)
*H02J 3/00* (2006.01)

(52) U.S. Cl.
CPC ............ *G06F 21/554* (2013.01); *H02J 3/001* (2020.01); *G06F 2221/034* (2013.01)

(58) Field of Classification Search
None
See application file for complete search history.

(56) References Cited

U.S. PATENT DOCUMENTS 10,305,932 B2 * 5/2019 Hong ................... H04L 63/1466
11,593,479 B1 * 2/2023 Sarwat ..................... G06F 21/81
(Continued)

FOREIGN PATENT DOCUMENTS

CN 110474892 A 11/2019
CN 112701723 A 4/2021
(Continued)

OTHER PUBLICATIONS

Pengcheng Cai, et al., Secondary Frequency Control of Islanded Microgrids Based on Ratio Consensue Algorithm, Acta Energiae Solaris Sinica, 2020, pp. 74-81, vol. 41 No. 10.

*Primary Examiner* — Shin-Hon (Eric) Chen
(74) *Attorney, Agent, or Firm* — Bayramoglu Law Offices LLC

(57) ABSTRACT

A microgrid self-triggering control method and system for resisting FDI attacks is provided. The method includes the following steps: S1: adopting primary control based on droop control for a microgrid; S2: designing a secondary control strategy of the microgrid, where the secondary control strategy includes frequency recovery and fair distribution of active power; and S3: designing a microgrid distributed self-triggering control method of a hash encryption method after considering the condition that the FDI attacks are injected into a secondary control communication link, so as to resist false malicious data in the microgrid and achieve secondary control. According to the microgrid self-triggering control method and system, a distributed secondary control target of the microgrid is achieved even under the FDI attacks, the injected malicious data can be quickly detected and eliminated, and the distributed secondary control communication network of the microgrid can be protected.

9 Claims, 7 Drawing Sheets
(4 of 7 Drawing Sheet(s) Filed in Color)

(56) References Cited

U.S. PATENT DOCUMENTS

| | | | | |
|---|---|---|---|---|
| 2018/0024900 A1* | 1/2018 | Premerlani | ........ | G05B 23/0227 |
| | | | | 714/41 |
| 2019/0113549 A1* | 4/2019 | Nakayama | ........... | G01R 22/066 |
| 2020/0036748 A1 | 1/2020 | Tebekaemi et al. | | |
| 2020/0106301 A1* | 4/2020 | Hong | ...................... | G06F 30/20 |
| 2022/0342435 A1* | 10/2022 | Qi | ............................ | H02J 3/38 |

FOREIGN PATENT DOCUMENTS

| | | | | |
|---|---|---|---|---|
| CN | 114336674 A | | 4/2022 | |
| CN | 115225305 A | | 10/2022 | |
| CN | 116094769 A | * | 5/2023 | ............. G06F 21/55 |

\* cited by examiner

MICROGRID SELF-TRIGGERING CONTROL METHOD AND SYSTEM FOR RESISTING FDI ATTACKS

CROSS REFERENCE TO THE RELATED APPLICATIONS

This application is based upon and claims priority to Chinese Patent Application No. 202311101885.X, filed on Aug. 29, 2023, the entire contents of which are incorporated herein by reference.

TECHNICAL FIELD

The present invention relates to the technical field of microgrid control, and more specifically to a microgrid self-triggering control method and system for resisting FDI attacks.

BACKGROUND

At present, with the rapid development of information systems, microgrids face more potential threats of cyber attacks. Among many network attacks, false data injection (FDI) attacks can be applied without causing controller tracking errors and are difficult to be directly detected and eliminated by distributed controllers.

However, the traditional microgrid distributed secondary control has a small fixed sampling period, which inevitably wastes communication and computing resources.

Therefore, to solve the above problems, a microgrid distributed self-triggering control strategy and system for resisting FDI attacks based on a hash encryption algorithm are provided.

SUMMARY

In view of this, the present invention provides a microgrid self-triggering control method and system for resisting FDI attacks, which achieves a distributed secondary control target of the microgrid even under the FDI attacks, quickly detects and eliminates the injected malicious data, and protects the distributed secondary control communication network of the microgrid. Meanwhile, the present invention significantly reduces the computing and communication burden of a controller, effectively ensures the stable operation of the microgrid.

In order to achieve the above objective, the present invention adopts the following technical solutions.

A microgrid self-triggering control method for resisting FDI attacks includes the following steps:

S1: adopting primary control based on droop control for the microgrid;

S2: designing a secondary control strategy of the microgrid, which includes frequency recovery and fair distribution of active power; and S3: designing a microgrid distributed self-triggering control method of a hash encryption method after considering the condition that the FDI attacks are injected into a secondary control communication link, so as to resist false malicious data in the microgrid and achieve secondary control.

Preferably, the control method further includes the following step:

S4: performing verification by a Lyapunov stability method and a simulation experiment.

Preferably, in the S1, the microgrid adjusts output of each distributed generation by adopting a primary control strategy based on droop control to so as to achieve rapid balance between load and output power in the microgrid.

Preferably, the S2 includes the following steps:

for the frequency recovery, recovering the frequency setting of the microgrid by adopting a local PI control method; and for the fair distribution of active power, setting an active power self-triggering controller for each distributed generation i in the microgrid, and achieving the fair distribution of active power through the active power self-triggering controller.

Preferably, the S3 includes the following steps:

S31: the distributed generation performs hash transformation on the active power value to be transmitted to obtain a corresponding self hash transformation value and sends the hash transformation value to an adjacent distributed generation;

S32: after the adjacent distributed generation receives corresponding data packet, the adjacent distributed generation performs hash transformation on the received active power value to obtain a corresponding received hash transformation value; and S33: the adjacent distributed generation judges the self hash transformation value and the received hash transformation value, if the two hash values are not equal, the distributed generation is judged to suffer from the FDI attacks, and otherwise, the distributed generation is not attacked by the FDI attacks.

Preferably, in the S33, when FDI attacks occur, the received hash transformation value is not used, but an active power value before the transformation is used.

The present invention further provides a control system using the microgrid self-triggering control method for resisting FDI attacks according to any one of aspects, which includes:

a primary control module, configured to adjust output of each distributed generation in the microgrid by applying a droop control strategy so as to achieve rapid balance between load and output power in the microgrid;

a secondary control module, configured to design a secondary control strategy of the microgrid, which includes frequency recovery and fair distribution of active power; and an attack module, configured to design a microgrid distributed self-triggering control method of a hash encryption method after considering the condition that the FDI attacks are injected into a secondary control communication link, so as to resist false malicious data in the microgrid and achieve secondary control.

Preferably, the control system further includes:

a verification module, configured to perform verification by applying a Lyapunov stability method and a simulation experiment.

It can be known from the technical solutions that, compared with the prior art, the present invention provides a microgrid self-triggering control method and system for resisting FDI attacks, and has the following beneficial effects.

(1) The present invention designs a distributed self-triggering control strategy and system for resisting FDI attacks based on a hash encryption algorithm on the basis of the traditional distributed time-triggering-based control strategy. Firstly, the distributed self-triggering control strategy is designed to enable the controller to trigger only when a triggering condition is met, and the computing and communication burden of the controller is significantly reduced. Moreover, the hash encryption algorithm is designed, so that the distributed secondary control target of the microgrid can be achieved even under the FDI attacks, and the stable operation of the microgrid is effectively ensured.

(2) It is proved from the Lyapunov stability theory and simulation experiments that the control method of the present invention can still achieve the distributed secondary control target of the microgrid even under the FDI attacks, and achieve frequency recovery and fair distribution of active power.

In conclusion, compared with the traditional distributed control strategy based on time triggering, the present invention significantly reduces the computing and communication burden of the controller, and achieves safe and stable operation of the microgrid under the FDI attacks; in addition, the improved self-triggering control strategy is also applicable to various FDI attacks.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

To more clearly illustrate the technical solutions in the embodiments of the present invention or in the prior art, the drawings required to be used in the description of the embodiments or the prior art are briefly introduced below. It is obvious that the drawings in the description below are merely embodiments of the present invention, and those of ordinary skill in the art can obtain other drawings according to the drawings provided without creative efforts.

DETAILED DESCRIPTION OF THE EMBODIMENTS

The following clearly and completely describes the technical solutions in the embodiments of the present invention with reference to drawings in the embodiments of the present invention. It is clear that the described embodiments are merely a part rather than all of the embodiments of the present invention. Based on the embodiments of the present invention, all other embodiments obtained by those of ordinary skill in the art without creative efforts shall fall within the protection scope of the present invention.

Embodiment 1

Figure 1:
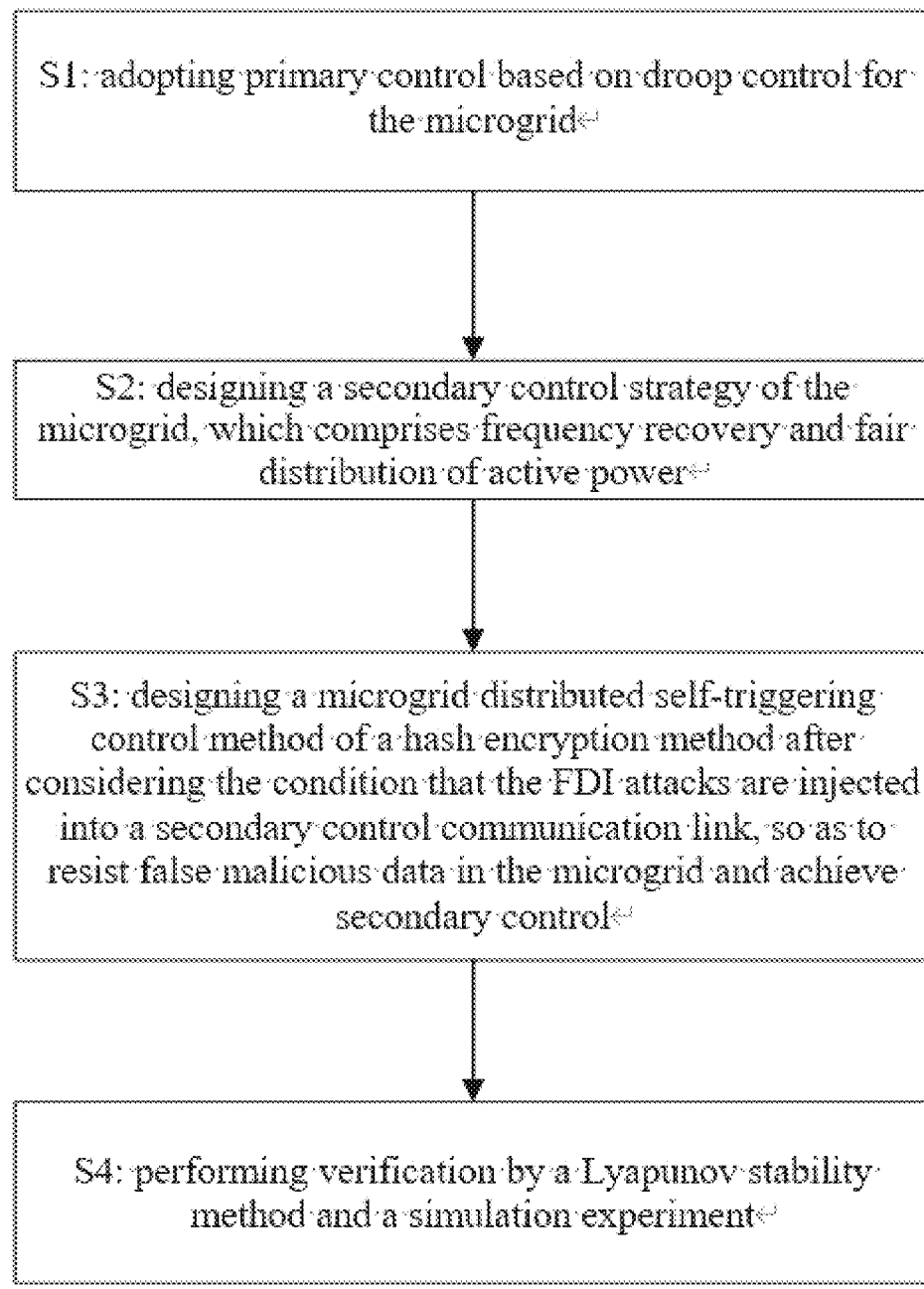
FIG. 1 is an overall flowchart of a microgrid self-triggering control method for resisting FDI attacks provided in the present invention.

As shown in FIG. 1, Embodiment 1 of the present invention discloses a microgrid self-triggering control method for resisting FDI attacks, which includes the following steps:
  S1: adopting primary control based on droop control for the microgrid;
  S2: designing a secondary control strategy of the microgrid, which includes frequency recovery and fair distribution of active power; and
  S3: designing a microgrid distributed self-triggering control method of a hash encryption method after considering the condition that the FDI attacks are injected into a secondary control communication link, so as to resist false malicious data in the microgrid and achieve secondary control.

In a specific embodiment, the control method further includes the following step:
  S4: performing verification by a Lyapunov stability method and a simulation experiment.

In a specific embodiment, in the S1, the microgrid adjusts output of each distributed generation by adopting a primary control strategy based on droop control to so as to achieve rapid balance between load and output power in the microgrid.

In a specific embodiment, the S2 includes the following steps:
  for the frequency recovery, recovering the frequency setting of the microgrid by adopting a local PI control method; and
  for the fair distribution of active power, setting an active power self-triggering controller for each distributed generation i in the microgrid, and achieving the fair distribution of active power through the active power self-triggering controller.

In a specific embodiment, the S3 includes the following steps:
  S31: the distributed generation performs hash transformation on the active power value to be transmitted to obtain a corresponding self hash transformation value and sends the hash transformation value to an adjacent distributed generation;
  S32: after the adjacent distributed generation receives corresponding data packet, the adjacent distributed generation performs hash transformation on the received active power value to obtain a corresponding received hash transformation value; and
  S33: the adjacent distributed generation judges the self hash transformation value and the received hash transformation value, if the two hash values are not equal, the distributed generation is judged to suffer from the FDI attacks, and otherwise, the distributed generation is not attacked by the FDI attacks.

In a specific embodiment, in the S33, when FDI attacks occur, the received hash transformation value is not used, but an active power value before the transformation is used.

Figure 2:
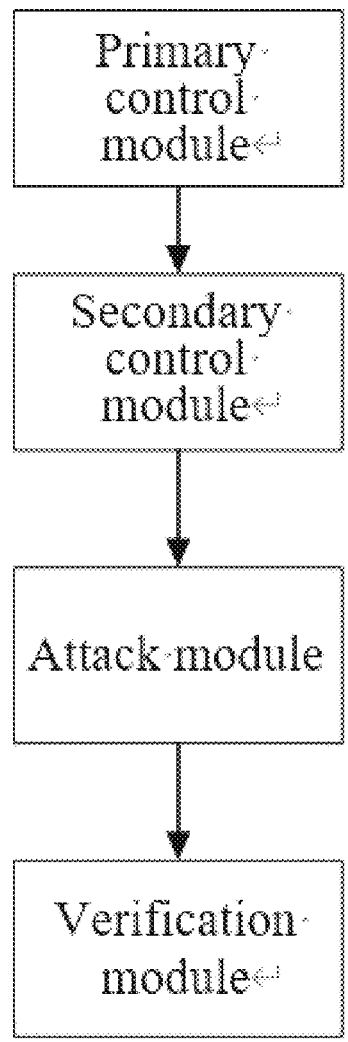
FIG. 2 is a block diagram of a structural principle of a microgrid self-triggering control system for resisting FDI attacks provided in the present invention.

Referring to FIG. 2, Embodiment 1 of the present invention further provides a control system using the microgrid self-triggering control method for resisting FDI attacks according to any one of the above embodiments, which includes:

a primary control module, configured to adjust output of each distributed generation in the microgrid by applying a droop control strategy so as to achieve rapid balance between load and output power in the microgrid;

a secondary control module, configured to design a secondary control strategy of the microgrid, which includes frequency recovery and fair distribution of active power; and an attack module, configured to design a microgrid distributed self-triggering control method of a hash encryption method after considering the condition that the FDI attacks are injected into a secondary control communication link, so as to resist false malicious data in the microgrid and achieve secondary control.

In a specific embodiment, the control system further includes:

a verification module, configured to perform verification by applying a Lyapunov stability method and a simulation experiment.

Embodiment 2

The detailed process of specifically applying the method provided in Embodiment 1 includes the following steps.

Step 1: the microgrid adjusts output of each distributed generation in the microgrid by adopting a primary control strategy based on droop control to achieve rapid balance between load and output power in the microgrid, the frequency-active power is taken as an example, and the specific expression of the droop control is as follows:

$$\omega_i = \omega_{ni} - m_{pi} P_i \tag{1}$$

wherein $\omega_i$ and $\omega_{ni}$ are the output frequency and the frequency set point of the distributed generation i, $P_i$ is a terminal active power of the distributed generation i, and $m_{pi}$ is a ω-p control droop coefficient of the distributed generation i.

Step 2: a corresponding microgrid distributed secondary control strategy is designed, wherein the distributed secondary control strategy includes frequency recovery and fair distribution of active power, specifically, (1) for the frequency recovery, the voltage and the frequency of each distributed generation are recovered to reference values by adopting local PI control; (2) for the fair distribution of active power, firstly, an active power self-triggering controller based on a linear clock is designed for each distributed generation, so that the controller is triggered only when the condition is met, fair distribution of the active power according to the capacity of each distributed generation is achieved, and the specific process includes as follows:

the distributed secondary control target of the microgrid is specifically as follows:

$$\lim_{t \to \infty} |\omega_i - \omega_{ref}| = 0 \tag{2}$$

$$m_{p1} P_1 = \ldots = m_{pn} P_n \tag{3}$$

wherein i=1, 2, . . . n; and $\omega_{ref}$ is the reference frequency.

For the frequency recovery, a frequency set point $\omega_{ni}$ is adjusted by adopting a local PI control so as to recover the voltage and the frequency of each distributed generation to a reference value, wherein a specific expression of the frequency set point $\omega_{ni}$ is as follows:

$$\omega_i = \omega_{ni} + u_{\omega i} + u_{Pi} - m_{pi} P_i \tag{4}$$

wherein $u_{\omega i}$ is frequency control input, and $u_{Pi}$ is active power control input.

A specific expression of recovering the frequency of each distributed generation by adopting the local PI control is as follows:

$$u_{\omega i} = -k_P(\omega_i - \omega_{ref}) - k_I \int (\omega_i - \omega_{ref}) dt \tag{5}$$

wherein $\omega_{ref}$ is reference frequency, $k_P$ and $k_I$ are proportional and integral coefficients of a local PI controller, respectively.

For active power distribution, a specific expression of designing the active power control input $u_{Pi}$ is as follows:

$$u_{Pi} = -k_P \sum_{j \in N_i} a_{ij}(m_{pi} P_i - m_{pj} P_j) \tag{6}$$

wherein $k_P > 0$ is an active power control gain, and $N_i$ is a neighbor set of the distributed generation i.

It can be seen that the traditional active power control strategy is periodic sampling communication, which inevitably increases the waste of communication and computing resources. Therefore, in this embodiment, a specific expression of performing aperiodic triggering by designing the distributed active power self-triggering controller is as follows:

$$\begin{cases} m_{pi} \dot{P}_i = u_{pi} = \sum_{j \in N_i} u^{ij} \\ \dot{u}^{ij} = 0 \\ \dot{\theta}^{ij} = -1 \end{cases} \tag{7}$$

wherein $m_p P$ is an active power state variable of the distributed generation i, $u^{ij} \in \{-\gamma, 0, \gamma\}$ is a local active power control input of the distributed generation i and a distributed generation j, and $\theta^{ij}$ is a clock variable on a communication link (i, j)∈ E.

A specific expression of defining a trigger rule of the active power self-triggering controller is as follows:

wherein when $\theta^{ij}$ reaches 0, the distributed generation i obtains active power state information of the distributed generation j, then the active power control input $u^{ij}$ and the clock variable $\theta^{ij}$ are correspondingly updated.

A specific expression of an active power difference $med^{ij}$(t) between the distributed generation i and the distributed generation j at the moment t is as follows:

$$med^{ij}(t) = m_{pj} P_j(t) - m_{pi} P_i(t) \tag{8}$$

Correspondingly, a specific expression of an update rule for designing the active power control input $u^{ij}$ is as follows:

$$u^{ij}(t^+) = \begin{cases} \text{sign}_\varepsilon(med^{ij}(t)) & \text{if } |med^{ij}(t)| \geq \varepsilon \\ u^{ij}(t) & \text{otherwise} \end{cases} \tag{9}$$

wherein $\text{sign}_\varepsilon(med^{ij}(t))$ meets the following formula:

$$\text{sign}_\varepsilon(med^{ij}(t)) = \begin{cases} \gamma \text{sign}(med^{ij}(t)) & \text{if } |med^{ij}(t)| \geq \varepsilon \\ 0 & \text{otherwise} \end{cases} \tag{10}$$

wherein sign (x) is a sign function, $\gamma > 0$ is a constant, and $\varepsilon > 0$ is a preset active power error.

An update rule for designing the clock variable $\theta^{ij}$ is as follows:

$$\theta^{ij}(t^+) = \begin{cases} f^{ij}(m_{pi}P_i(t)) & \text{if } |med^{ij}(t)| \geq \varepsilon \\ \theta^{ij}(t) & \text{otherwise} \end{cases} \quad (11)$$

wherein $f^{ij}(m_{pi}P_i(t))$ may be specifically represented as:

$$f^{ij}(m_{pi}P_i(t)) = \begin{cases} \dfrac{|med^{ij}|}{2\gamma(d_i + d_j)} & \text{if } |med^{ij}(t)| \geq \varepsilon \\ \dfrac{\varepsilon}{2\gamma(d_i + d_j)} & \text{otherwise} \end{cases} \quad (12)$$

correspondingly, the trigger moment of the active power self-triggering controller is defined as:

$$t_{k+1}{}^{ij} = t_k{}^{ij} + f^{ij}(m_{pi}P_i(t_k{}^{ij})) \quad (13)$$

wherein $t_k{}^i$ is a $k^{th}$ triggering moment of the active power self-triggering controller of distributed generation i.

Therefore, the fair distribution of the active power is achieved by properly designing the distributed active power self-triggering controller.

Step 3: a microgrid distributed self-triggering control strategy is designed based on a hash encryption algorithm, so that the microgrid can still achieve a distributed secondary control target even under the FDI attacks. Firstly, the designing of a hash encryption algorithm is specifically as follows:

performing hash transformation on each active power value to be transmitted, which is specifically expressed as:

$$H(B_{ij}) = B_{ij} << 3 \quad (14)$$

wherein $B_{pj}$ is a binary value of the active power $P_j$, and $H(B_{pj})$ is a binary value of $B_{pj}$ shifted to the left by 3 bits; and therefore, the hash transformation of the active power $P_j$ is represented as: $P_j \to H_j$.

The designing of a microgrid distributed self-triggering control strategy for resisting FDI attack based on a hash encryption algorithm is as follows:

each distributed generation sends its own active power value and the corresponding hash transformation value to the adjacent distributed generation. When receiving the corresponding data packet, the adjacent distributed generation performs hash transformation on the received active power value, and compares the received hash transformation value with a hash value obtained after the hash transformation is performed on the received hash transformation value, and if the two hash values are not equal, the FDI attack signal is detected to be received. A distributed generation i is taken as an example, which is specifically designed as follows:

the distributed generation j sends its own active power value $P_j$ and a corresponding hash transformation value $H_j$ to the distributed generation i, which is represented as $(P_j, H_j)$. When the distributed generation i receives the active power value $P_j'$ of the distributed generation j, the hash transformation is performed to obtain a hash value $H_j'$. If $H_j' = H_j$, it indicates that the communication link does not suffer from the FDI attacks, and otherwise, the communication link suffers from the FDI attacks. The strategy achieves the secondary control target of the microgrid under the FDI attacks.

Step 4: it is proved from the Lyapunov stability theory and simulation experiments that the control method of the present invention can still achieve the distributed secondary control target of the microgrid even under the FDI attacks.

For any $t > 0$ and $\gamma > 0$, the Lyapunov function $V(t)$ is defined as:

$$V(t) = \frac{1}{2}[m_p P(t)]^T [m_p P(t)] \quad (15)$$

wherein $m_p P(t) = [m_{p1}P_1(t), \ldots, m_{pn}P_n(t)]^T$, $V(t) > 0$ is noted.

The formula (15) is derived to obtain:

$$\dot{V}(t) = \frac{1}{2}[m_{pi}\dot{P}_i(t)]^T [m_{pi}P_i(t)] + \frac{1}{2}[m_{pi}P_i(t)]^T [m_{pi}\dot{P}_i(t)] \quad (16)$$

The formulas (9), (10) and (11) are substituted into the formula (16) to obtain:

$$\dot{V}(t) = \sum_{i=1}^{n} m_{pi}P_i(t) u^{ij}(t) = \quad (17)$$

$$\sum_{i=1}^{n} m_{pi}P_i(t) \text{sign}_\varepsilon(med^{ij}(t)) = -\gamma \sum_{A} med^{ij}(t) \text{sign}(med^{ij}(t_k^{ij}))$$

wherein $A = \{|med^{ij}(t_k{}^{ij})| \geq \varepsilon, \forall (i,j) \in E\}$.

For $t \in [t_k{}^{ij}, t_{k+1}{}^{ij})$, if $med^{ij}(t_k{}^{ij}) \geq \varepsilon$, the derivation is performed to obtain:

$$m_{pj}P_j(t) - m_{pi}P_i(t) \geq \quad (18)$$

$$m_{pj}P_j(t_k^{ij}) - m_{pi}P_i(t_k^{ij}) - \gamma(d_i + d_j)(t - t_k^{ij}) \geq \frac{med^{ij}(t_k^{ij})}{2}$$

Correspondingly, if $med^{ij}(t_k{}^{ij}) \leq -\varepsilon$, the derivation is performed to obtain:

$$m_{pj}P_j(t) - m_{pi}P_i(t) \leq \frac{med^{ij}(t_k^{ij})}{2} \quad (19)$$

Therefore, if $|med^{ij}(t_k{}^{ij})| \geq \varepsilon$, the following can be obtained:

$$med^{ij}(t)\text{sign}_\varepsilon(med^{ij}(t_k^{ij})) = med^{ij}(t)\text{sign}_\varepsilon(med^{ij}(t)) = |med^{ij}(t)| \quad (20)$$

The following is obtained:

$$|med^{ij}(t)| \geq |m_{pj}P_j(t_k^{ij}) - m_{pi}P_i(t_k^{ij})| - \gamma(d_i + d_j)(t - t_k^{ij}) \geq \frac{|med^{ij}(t_k^{ij})|}{2} \quad (21)$$

Combined with the formulas (18) and (19), the formula (16) can be written as:

$$V(t) \leq -\gamma \sum_A \frac{|med^j(t_k^{ij})|}{2} \leq -\gamma \sum_A \frac{\varepsilon}{2} \quad (22)$$

Since $\gamma>0$, $\dot{v}(t)$ is strictly negative semidefinite.

The proof is complete.

Figure 3:
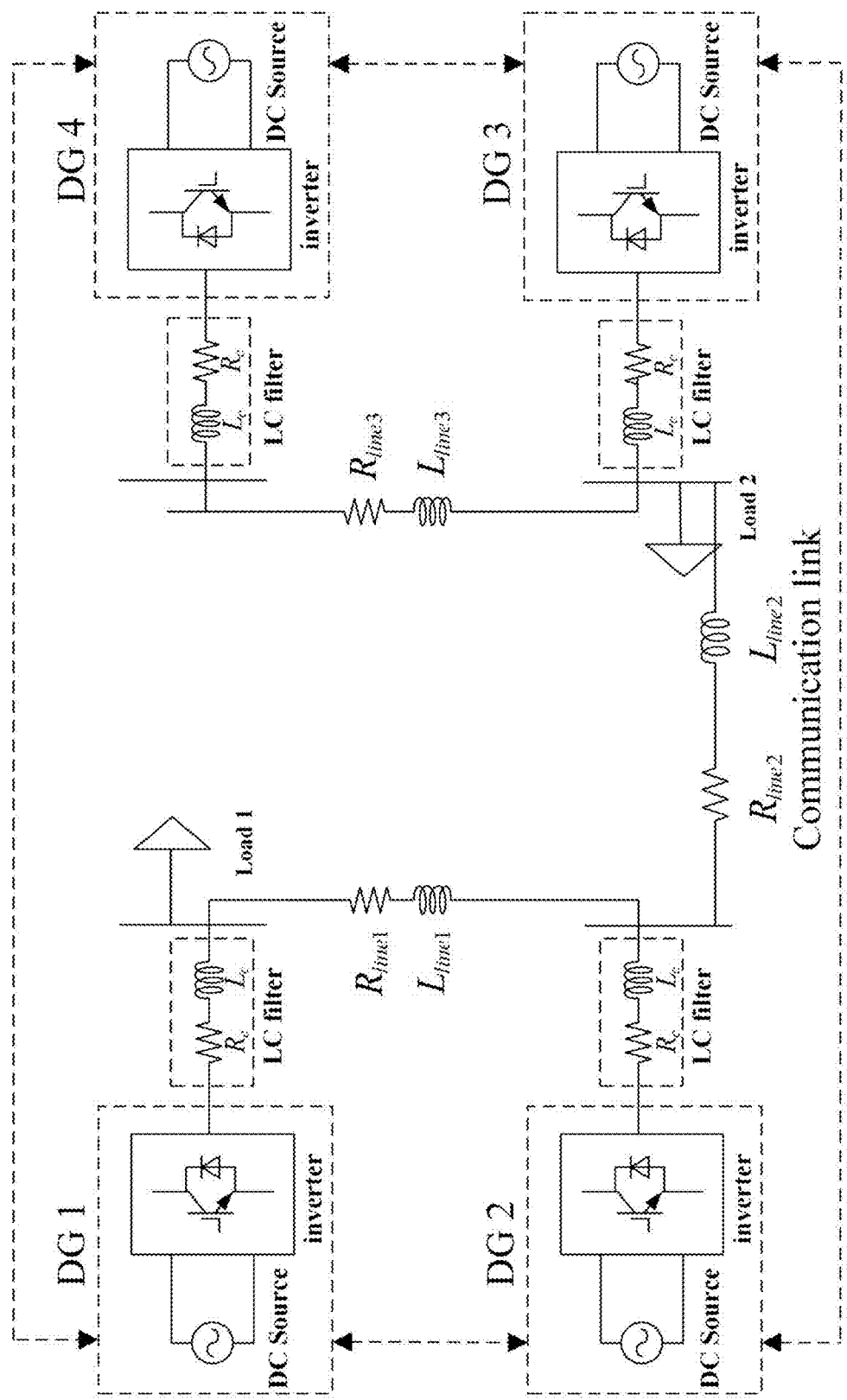
FIG. 3 is a structural diagram of an islanded microgrid test system provided in Embodiment 2 of the present invention.

In a specific application, the islanded microgrid test system is shown in FIG. 3, and system parameters are shown in Table 1.

TABLE 1

Parameters of islanded microgrid test system

| | DG1&2 (10.64 kW) | | DG3&4 (8.0 kW) | |
|---|---|---|---|---|
| Distributed generation | $m_p$<br>$9.4 \times 10^{-5}$ | $n_q$<br>$2 \times 10^{-4}$ | $m_p$<br>$12.5 \times 10^{-5}$ | $n_q$<br>$2 \times 10^{-4}$ |
| | $R_c$<br>0.2 | $L_c$<br>$3 \times 10^{-3}$ | $R_c$<br>0.2 | $L_c$<br>$3 \times 10^{-3}$ |
| Line | Line 1 | | Line 2 | Line 3 |
| | $R_{Line1}$<br>0.23 | $L_{Line1}$<br>$0.318 \times 10^{-3}$ | $R_{Line2}$ $L_{Line2}$<br>0.35 $1.847 \times 10^{-3}$ | $R_{Line3}$ $L_{Line3}$<br>0.23 $0.318 \times 10^{-3}$ |
| Load | Load 1 | | Load 2 | |
| | $P_{Load1}$<br>$10 \times 10^3$ | $Q_{Load1}$<br>$15 \times 10^3$ | $P_{Load2}$<br>$15.6 \times 10^3$ | $Q_{Load2}$<br>$7.6 \times 10^3$ |

To verify the effectiveness of the proposed microgrid distributed self-triggering control strategy for resisting FDI attack based on the hash encryption algorithm, the simulation process is designed as follows:

1) t=0 s, the microgrid enters an island operation mode;

2) t=1 s, the distributed self-triggering control strategy of the microgrid for resisting FDI attacks based on the hash encryption algorithm is applied;

3) t=2 s, load 1 increases the load by 3 kW;

4) t=3.5 s, the random FDI attacks are injected to the communication link; and 5) t=4.5 s, DG1 increases the load by 3 kW.

The total simulation time is 7 s; wherein the self-triggering controller parameter $k_\omega=40$, and the frequency reference value $\omega_{ref}=50$ Hz.

Figure 4A:
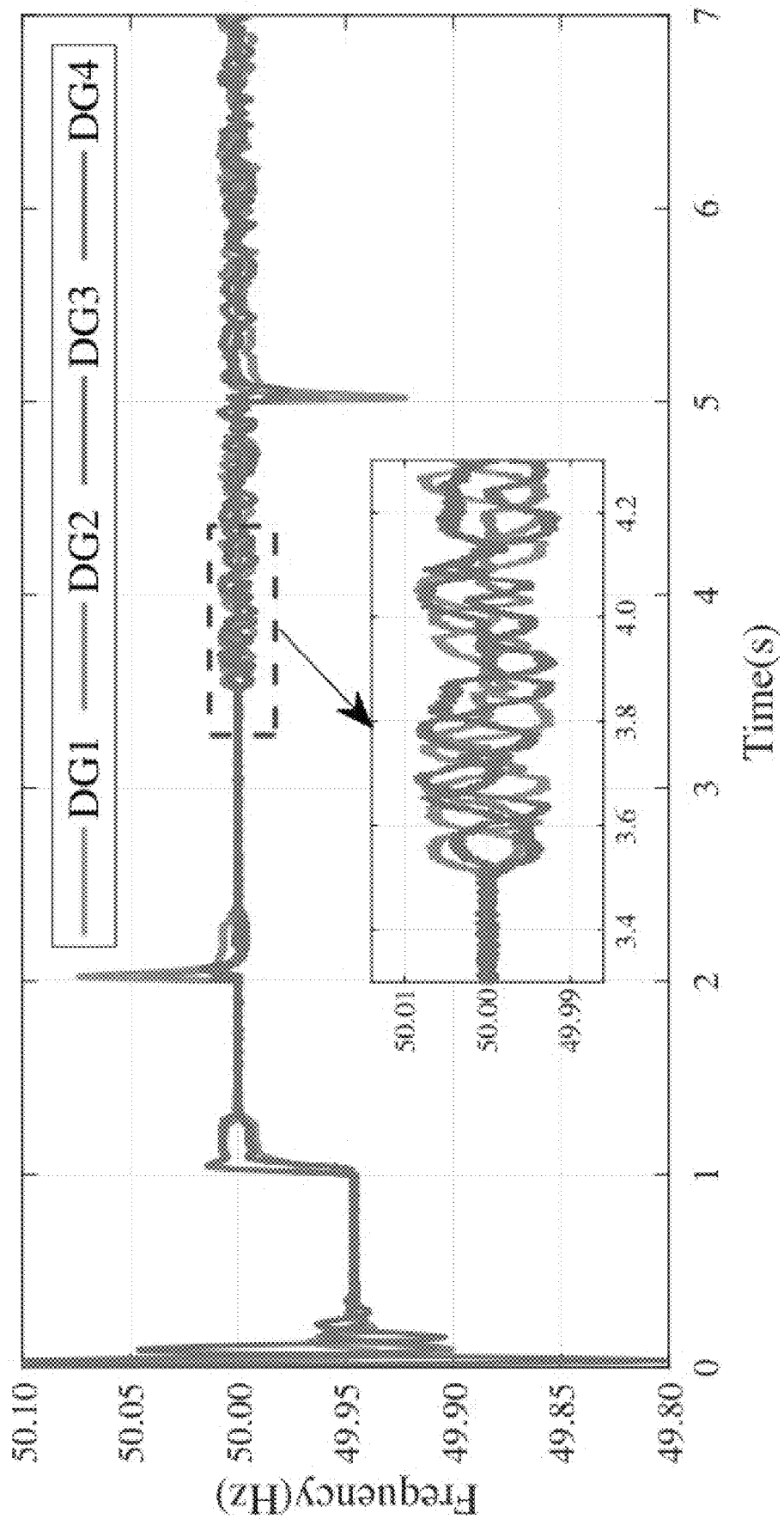
FIG. 4A is a schematic diagram of output frequencies of distributed generations using a traditional control strategy based on time triggering under FDI attacks provided in Embodiment 2 of the present invention.
Figure 4B:
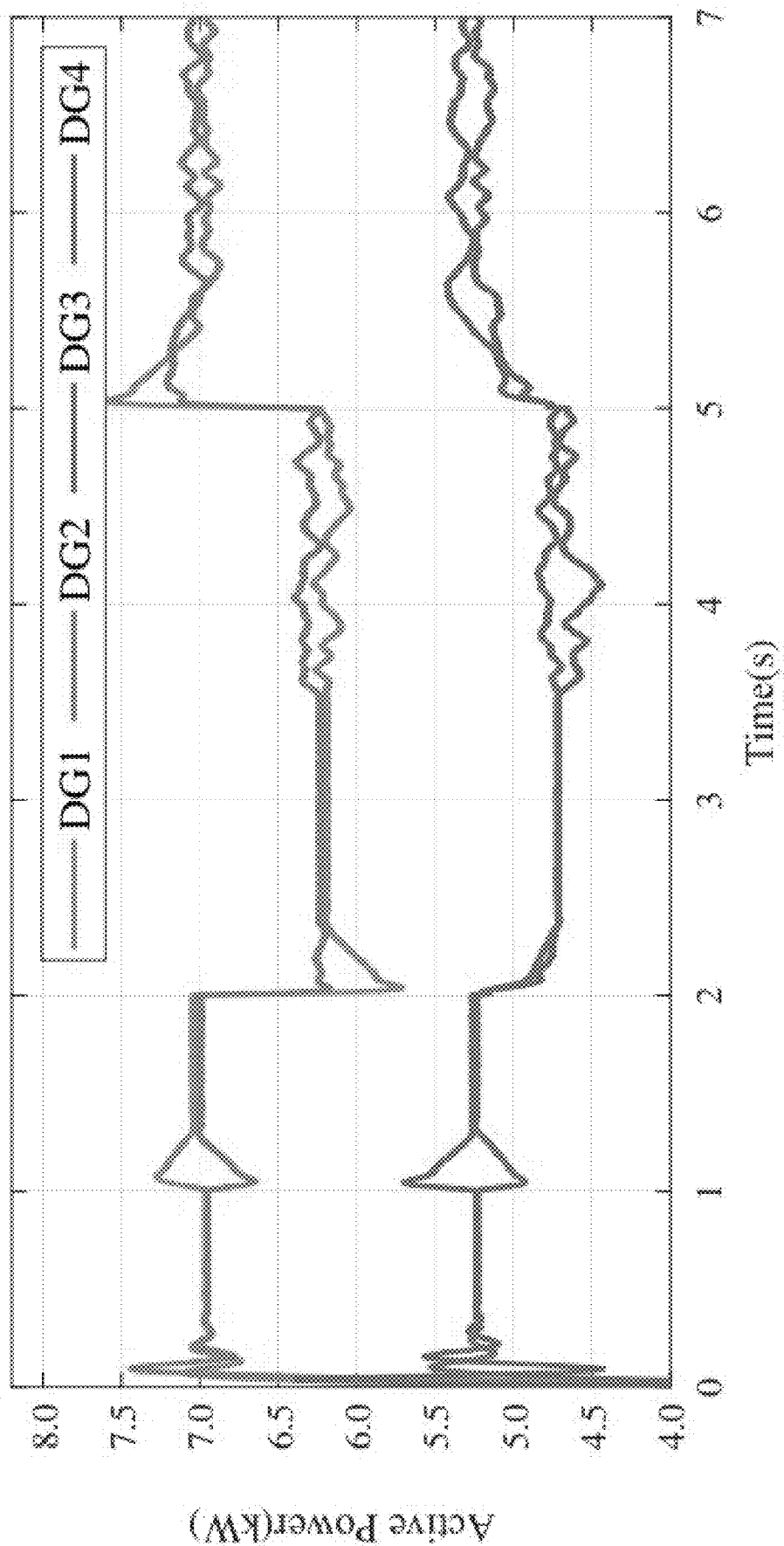
FIG. 4B is a schematic diagram of output active powers of distributed generations using a traditional control strategy based on time triggering under FDI attacks provided in Embodiment 2 of the present invention.

The experimental screenshots are as follows:

(1) FIG. 4A and FIG. 4B respectively show the frequency and active power of each distributed generation under the conventional control method. During 0 s to 1 s, the output frequency of each distributed generation is below 50 Hz using the droop control strategy. When t=1 s, the frequency of each distributed generation is restored to 50 Hz by applying the traditional distributed secondary control strategy based on time triggering, and meanwhile, fair distribution of active power is achieved. The performance verifies the effectiveness of the provided microgrid distributed self-triggering control strategy. However, when t=3.5 s, random FDI attacks are injected into the communication link, the frequency of each distributed generation deviates from the reference value again, and even oscillation occurs, so that it is of practical significance to design an effective control strategy to resist the FDI attacks.

Figure 5A:
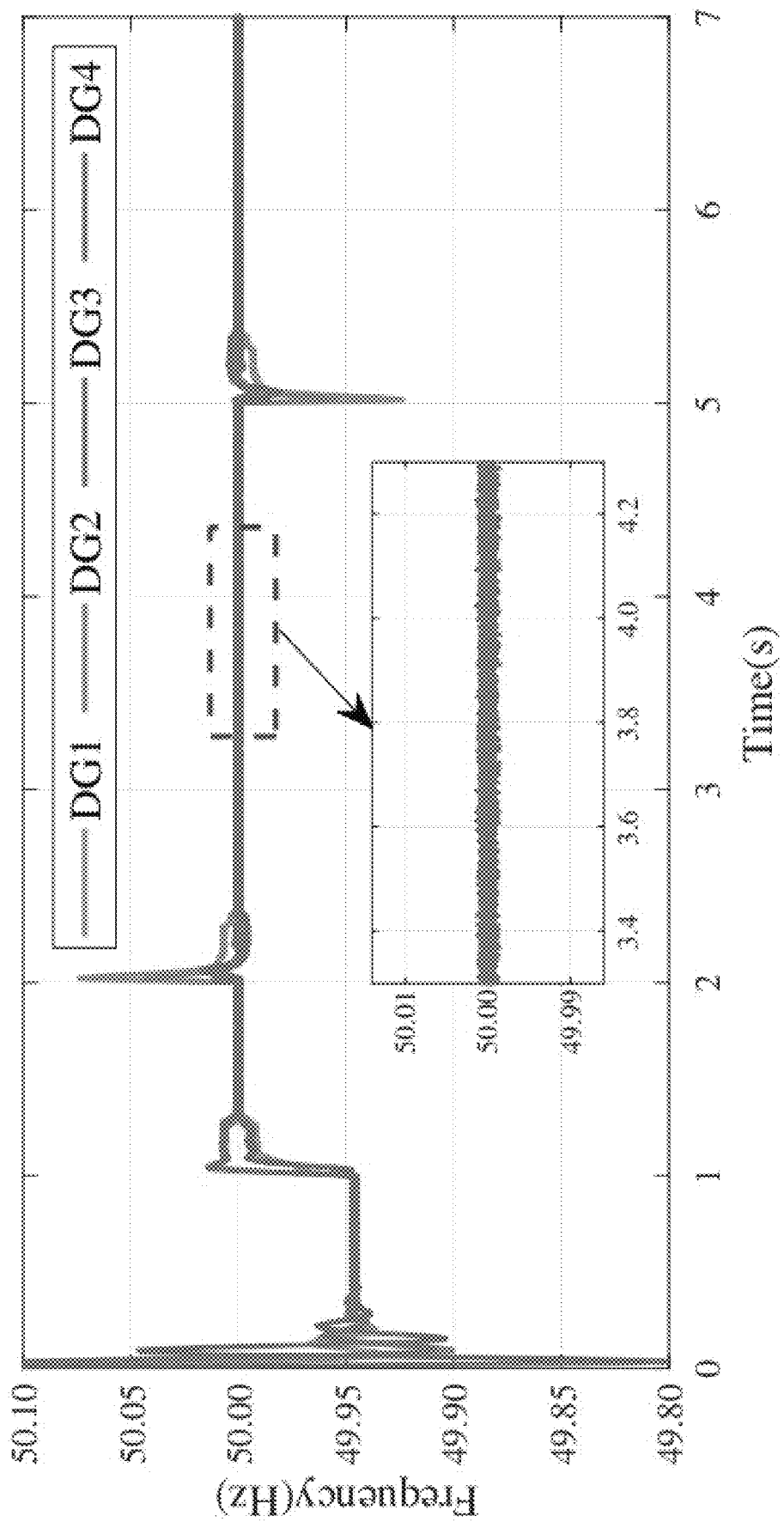
FIG. 5A is a schematic diagram of output frequencies of distributed generations using a control strategy of the present invention under FDI attacks provided in Embodiment 2 of the present invention.
Figure 5B:
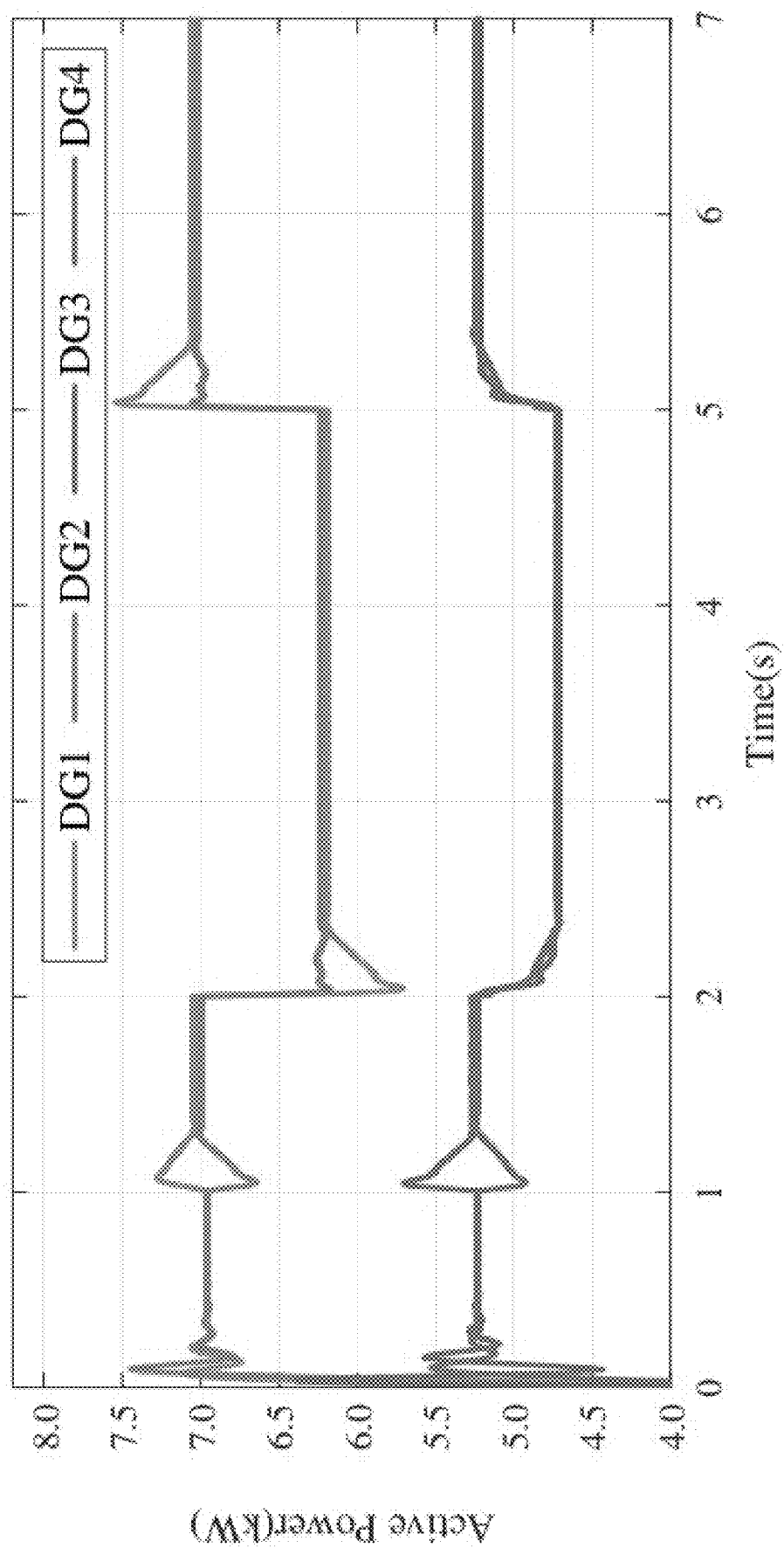
FIG. 5B is a schematic diagram of output active powers of distributed generations using a control strategy of the present invention under FDI attacks provided in Embodiment 2 of the present invention.

(2) FIG. 5A and FIG. 5B respectively show schematic diagrams of the frequency and the active power of each distributed generation under the microgrid distributed self-triggering control strategy for resisting FDI attacks based on the hash encryption algorithm. It can be seen from the figure that even if the FDI attacks exist, the frequency of each distributed generation is still stabilized at the reference value by applying the strategy for resisting the FDI attacks provided in the present invention, and the fair distribution of the active power is achieved. The control method provided in the present invention can still achieve the distributed secondary control target of the microgrid even under the FDI attacks.

The embodiments in the specification are all described in a progressive manner, and each embodiment focuses on differences from other embodiments, and portions that are the same and similar between the embodiments may be referred to each other. Since the apparatus disclosed in the embodiment corresponds to the method disclosed in the embodiment, the description is relatively simple, and reference may be made to the partial description of the method.

The above description of the disclosed embodiments enables those skilled in the art to implement or use the present invention. Various modifications to these embodiments will be readily apparent to those skilled in the art, and the generic principles defined herein may be applied to other embodiments without departing from the spirit or scope of the present invention. Thus, the present invention is not intended to be limited to these embodiments shown herein but is to be accorded the broadest scope consistent with the principles and novel features disclosed herein.

What is claimed is:

1. A microgrid self-triggering control method for resisting false data injection (FDI) attacks, wherein the microgrid self-triggering control method is performed by a control system of a microgrid containing electronic circuitries, and the method comprises the following steps:

S1: adopting a primary control based on a droop control for the microgrid;

S2: generating a secondary control strategy of the microgrid, wherein the secondary control strategy comprises a frequency recovery and a distribution of an active power; wherein the S2 comprises the following steps:

for the frequency recovery, recovering a frequency setting of the microgrid by adopting a local proportional-integral (PI) control method; and for the distribution of the active power, setting an active power self-triggering controller for each distributed generation i in the microgrid, wherein each of the distributed generation i represents a distributed power in the microgrid, and achieving the distribution of the active power through the active power self-triggering controller, wherein a distributed secondary control target of the microgrid is as follows:

$$\lim_{t\to\infty}|\omega_i - \omega_{ref}| = 0 \quad\quad 5$$

wherein i=1, 2, ... n, $\omega_{ref}$ is a reference frequency in Hz, $\omega_i$ is an output frequency of the distributed generation i, wherein $m_p P$ is an active power state variable of the distributed generation i, with both m and p not equal to zero;

for the frequency recovery, a frequency set point $\omega_{ni}$ is adjusted by adopting a local PI control to recover a voltage and a frequency of each distributed generation to a reference value, wherein an expression of the frequency set point $\omega_{ni}$ is as follows:

$$\omega_i = \omega_{ni} + u_{\omega i} + i_{Pi} - m_{pi}P_i$$

wherein $u_{\omega i}$ is a frequency control input, $u_{Pi}$ is an active power control input, $P_i$ is a terminal active power of the distributed generation i, and $m_{pi}$ is a $\omega$-p control droop coefficient of the distributed generation i;

an expression of recovering the frequency of each distributed generation by adopting the local PI control is as follows:

$$u_{\omega i} = -k_P(\omega_i - \omega_{ref}) - k_I\int(\omega_i - \omega_{ref})dt$$

wherein $\omega^{ref}$ is the reference frequency, $k_P > 0$ and $k_I > 0$ are a proportional coefficient and an integral coefficient of a local PI controller, respectively;

for an active power distribution, an expression of designing the active power control input $u_{Pi}$ is as follows:

$$u_{Pi} = -k_P \sum_{j \in N_i} a_{ij}(m_{pi}P_i - m_{pj}P_j)$$

wherein $k_P > 0$ is an active power control gain, $N_i$ is a neighbor set of the distributed generation i, $a_{ij} \in \{0, 1\}$ is the adjacent parameter associated with distributed generation i and distributed generation j, $a_{ij}=1$ means that distributed generation i is the neighbor of distributed generation j, $a_{ij}=0$ means that generation i is not the neighbor of distributed generation j;

an expression of performing an aperiodic triggering by designing a distributed active power self-triggering controller is as follows:

$$\begin{cases} m_{pi}\dot{P}_i = u_{pi} = \sum_{j \in N_i} u^{ij} \\ \dot{u}^{ij} = 0 \\ \dot{\theta}^{ij} = -1 \end{cases}$$

wherein $m_{pi}\dot{P}_i$ is an active power state variable of the distributed generation i, $u^{ij} \in \{-\gamma, 0, \gamma\}$ is a local active power control input of the distributed generation i and a distributed generation j, and $\theta^{ij}$ is a clock variable on a communication link (i, j)∈ E;

an expression of defining a trigger rule of the distributed active power self-triggering controller is as follows:

wherein when $\theta^{ij}$ reaches 0, the distributed generation i obtains active power state information of the distributed generation j, then the local active power control input $u^{ij}$ and the clock variable $\theta^{ij}$ are correspondingly updated, and an expression of an active power difference $med^{ij}(t)$ between the distributed generation i and the distributed generation j at a moment t is as follows:

$$med^{ij}(t) = m_{ij}P_j(t) - m_{pi}P_i(t)$$

correspondingly, an expression of an update rule for designing the local active power control input $u^{ij}$ is as follows:

$$u^{ij}(t^+) = \begin{cases} \text{sign}_\varepsilon(med^{ij}(t)) & \text{if } |med^{ij}(t)| \geq \varepsilon \\ u^{ij}(t) & \text{otherwise} \end{cases}$$

wherein $\text{sign}_\varepsilon(med^{ij}(t))$ meets a following formula:

$$\text{sign}_\varepsilon(med^{ij}(t)) = \begin{cases} \gamma\text{sign}(med^{ij}(t)) & \text{if } |med^{ij}(t)| \geq \varepsilon \\ \theta^{ij}(t) & \text{otherwise} \end{cases}$$

wherein sign (x) is a sign function, $\gamma > 0$ is a constant, and $\varepsilon > 0$ is a preset active power error;

an update rule for designing the clock variable $\theta^{ij}$ is as follows:

$$\theta^{ij}(t) = \begin{cases} f^{ij}(m_{pi}P_i(t)) & \text{if } |med^{ij}(t)| \geq \varepsilon \\ \theta^{ij}(t) & \text{otherwise} \end{cases}$$

wherein $f^{ij}(m_{pi}P_i(t))$ is represented as:

$$f^{ij}(m_{pi}P_i(t)) = \begin{cases} \dfrac{|med^{ij}(t)|}{2\gamma(d_i + d_j)} & \text{if } |med^{ij}(t)| \geq \varepsilon \\ \dfrac{\varepsilon}{2\gamma(d_i + d_j)} & \text{otherwise} \end{cases}$$

correspondingly, a trigger moment of the distributed active power self-triggering controller is defined as:

$$t_{k+1}^{ij} = t_k^{ij} + f^{ij}(m_{pi}P_i(t_k^{ij}))$$

wherein $t_k^i$ is a $k^{th}$ triggering moment of the active power self-triggering controller of distributed generation i;

achieving the distribution of the active power by above processes;

S3: generating a microgrid distributed self-triggering control method of a hash encryption method after considering a condition that the FDI attacks are injected into a secondary control communication link, to resist false malicious data in the microgrid and achieve a secondary control, wherein the S3 comprises the following steps:

S31: the distributed generation performs a hash transformation on an active power value to be transmitted to obtain a corresponding self hash transformation value and sends the corresponding self hash transformation value to an adjacent distributed generation;

S32: after the adjacent distributed generation receives a corresponding data packet, the adjacent distributed generation performs the hash transformation on a received active power value to obtain a corresponding received hash transformation value, wherein the corresponding received hash transformation value is expressed as:

$$H(B_{pj}) = B_{ij} << 3 \tag{14}$$

wherein $B_{pj}$ is a binary value of the active power $P_j$, and $H(B_{pj})$ is a binary value of $B_{pj}$ shifted to a left by 3 bits; and therefore, a hash transformation of the active power $P_j$ is represented as: $P_j \rightarrow H_j$;

S33: the adjacent distributed generation judges the corresponding self hash transformation value and the corresponding received hash transformation value, when the two hash values are not equal, the adjacent distributed generation is judged to suffer from the FDI attacks, and otherwise, the adjacent distributed generation is not attacked by the FDI attacks, comprising as follows:

each distributed generation sends an active power value of each distributed generation and a corresponding hash transformation value to the adjacent distributed generation, when receiving the corresponding data packet, the adjacent distributed generation performs the hash transformation on the received active power value, and compares the corresponding received hash transformation value with a hash value obtained after the hash transformation is performed on the corresponding received hash transformation value, and when the two hash values are not equal, an FDI attack signal is detected to be received.

2. The microgrid self-triggering control method for resisting the FDI attacks according to claim 1, further comprising the following step:

S4: performing a verification by a Lyapunov stability method and a simulation experiment.

3. The microgrid self-triggering control method for resisting the FDI attacks according to claim 1, wherein in the S1, the microgrid adjusts an output of each distributed generation by adopting a primary control strategy based on the droop control to achieve a rapid balance between a load and an output power in the microgrid.

4. The microgrid self-triggering control method for resisting the FDI attacks according to claim 1, wherein in the S33, when the FDI attacks occur, the corresponding received hash transformation value is not used, but an active power value before the transformation is used.

5. A control system using the microgrid self-triggering control method for resisting the FDI attacks according to claim 1, comprising:

a primary control circuitry, configured to adjust an output of each distributed generation in the microgrid by applying a droop control strategy to achieve a rapid balance between a load and an output power in the microgrid;

a secondary control circuitry, configured to design the secondary control strategy of the microgrid, wherein the secondary control strategy comprises the frequency recovery and the distribution of the active power; and an attack circuitry, configured to design the microgrid distributed self-triggering control method of the hash encryption method after considering the condition that the FDI attacks are injected into the secondary control communication link to resist the false malicious data in the microgrid and achieve the secondary control.

6. The control system according to claim 5, further comprising:

a verification circuitry, configured to perform a verification by applying a Lyapunov stability method and a simulation experiment.

7. The control system according to claim 5, wherein the microgrid self-triggering control method further comprises the following step:

S4: performing a verification by a Lyapunov stability method and a simulation experiment.

8. The control system according to claim 5, wherein in the S1 of the microgrid self-triggering control method, the microgrid adjusts the output of each distributed generation by adopting a primary control strategy based on the droop control to achieve the rapid balance between the load and the output power in the microgrid.

9. The control system according to claim 5, wherein in the S33 of the microgrid self-triggering control method, when the FDI attacks occur, the corresponding received hash transformation value is not used, but an active power value before the transformation is used.

* * * * *